United States Statutory Invention Registration [19]

[11] Reg. Number: H955

Waters

[43] Published: Aug. 6, 1991

[54] AIRCRAFT ATTITUDE RATE ESTIMATING DEVICE

[75] Inventor: William M. Waters, Millersville, Md.

[73] Assignee: United States of America, Washington, D.C.

[21] Appl. No.: 620,183

[22] Filed: Nov. 30, 1990

[51] Int. Cl.[5] ..... G01S 13/58

[52] U.S. Cl. ..... 342/108; 342/25; 342/147

*Primary Examiner*—Linda J. Wallace

*Attorney, Agent, or Firm*—Thomas E. McDonnell; Edward F. Miles

[57] ABSTRACT

An Inverse Synthetic Aperture Radar (ISAR) imaging system provides an image of an incoming aircraft for the purpose of deciding which retaliatory tactic, if any, will be employed. By estimating change rates in attitude about one or more of the roll, pitch, and yaw axes, for an aircraft on a course toward the search radar, estimates of rate of change provide information from which a reliable ISAR image may be prepared. A more identifiable target and relief from ambiguity about the apparent intentions of the incoming aircraft are the result.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIRCRAFT ATTITUDE RATE ESTIMATING DEVICE

BACKGROUND OF THE INVENTION

1. Field of the Invention

The present invention relates to systems for identifying an aircraft by ascertaining an image of its physical features, and it particularly relates to a system for orientation and scaling of a radar image whose characteristics simulate the external features of the aircraft structure.

2. Discussion of the Prior Art

Systems have been known in the past which provide images of aircraft for many reasons, including detection and early recognition of approaching enemy aircraft. Such images are useful in forming decisions to prepare for attack or, in the alternative, to decide against battle stations because interpretation of the image does not indicate that the aircraft has hostile intentions. One such system for producing radar signatures of incoming aircraft is generally called Inverse Synthetic Aperture Radar (ISAR). Unfortunately, it has been found with ISAR that the scaling and orientation of these images as seen from the reflections from the target depend largely upon the attitude of the target and its inflight changes about the roll, pitch and yaw axes.

Experimentation to provide images adequate for making command decisions in the face of an imminent enemy attack have been less than satisfactory in both processing the return information and from it deducing the physical shape of the incoming target. A basic weakness in these prior art systems has been the failure to recognize that in the orientation and scaling of the ISAR image these images are constantly changing as the attitude of the target changes. The rotation of the aircraft, for example, about the roll or longitudinal axis and relative to the radar antenna of the potential victim, causes radar observers extreme difficulty in accurately distinguishing the characteristics of the incoming aircraft. In fact, the invention recognizes that without some method of estimating the change in rate of attitude about the flight axes, most imaging radars would produce images frequently unrecognizable even by the best trained operators.

SUMMARY OF THE INVENTION

The present invention provides a scanning system which employs a plurality of radar apertures, the cooperation of which provides estimates of movements of an aircraft with respect to the yaw and/or pitch axes. The arrangement of components in the defensive radar system includes a tracking radar, a first auxiliary antenna spaced a distance $d_x$ along the x-axis originating from the location of the main radar antenna, and means which correlate the returns arriving at the main and auxiliary antennas to estimate yaw change rates of the approaching aircraft. Another feature of the invention is the optional provision of additional auxiliary antennas spacially related to the other axes of the main antenna.

Accordingly, an object of the invention is improved reliability in distinguishing enemy from friendly aircraft when the incoming aircraft is radiated by an Inverse Synthetic Aperture Radar.

Another object of the invention is to improve confidence in the results obtained from Inverse Synthetic aperture images.

A further object of the invention is to neutralize the difficulty experienced by radar observers when an incoming target is rotating relative to the microwave energy in the radar beam.

Yet another feature of the invention is the method for estimating the yaw rate of change and/or the pitch rate of change of an approaching target in a monopulse radar track.

Other objects of the invention will become apparent from the following detailed description of the embodiment of the present invention when taken in conjunction with the accompanying drawings.

BRIEF DESCRIPTION OF THE DRAWINGS

The same reference characters refer to the same elements throughout the several embodiments of the invention.

DESCRIPTION OF THE PREFERRED EMBODIMENT

Figure 1:
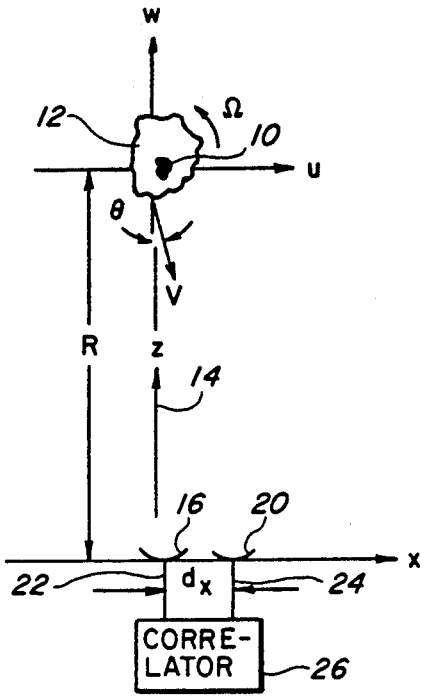
FIG. 1 is a view of a simulated return of propagated energy in accordance with the invention.

The system shown in FIG. 1 depicts the geometric relationship between an airborne target 10, the pattern 12 scattered from the target after impact with a primary radar beam 14, and a main antenna 16 of known construction for the transmission of radar energy generated by a microwave source not shown. The present invention requires the heretofore known use of a main antenna 16 capable of both transmitting microwave energy coupled to it and receiving in turn reflections from an airborne object such as the target 10.

Assumption of various parameters as illustrated in FIG. 1 are as follows; z and w axes are both coincident with the axis of the primary radar beam 14; an auxiliary antenna 20 operating in the receive mode only is spaced a distance $d_x$ along the x axis from the intersection of the z and x axes; the center of rotation of the target 10 occurs at the origin of the u, v and w axes, where the u axis is parallel to the x axis and the v axis (not shown) is normal to the plane of the paper in FIG. 1; the return signal magnitude $S_M(t)$ received at the main antenna 16 from target 10 appears on line 22 and its time dependence t varies with $\theta$ and $\phi$. The angles $\theta$ and $\phi$ are the angles that angular position unit vector V makes with the u, v and v, w planes, respectively; and the vector V is assumed to be centered at the axis of rotation of the target 10.

As shown in FIG. 1, the auxiliary signal magnitude $S_A(t)$ which appears on line 24 represents the return signal arriving at antenna 20 due to scattering of energy from the target 10. A correlator 26 has two input terminals coupled to receive the signals $S_M(t)$ and $S_A(t)$.

For the sake of simplicity, it will further be assumed from FIG. 1 that the illumination is fixed with respect to target 10 and that attitude changes occur only in the u, w plane, and are constant. Under these assumptions, $$S_A(t)=S_M(t-\Delta t). \tag{1}$$

Figure 2:
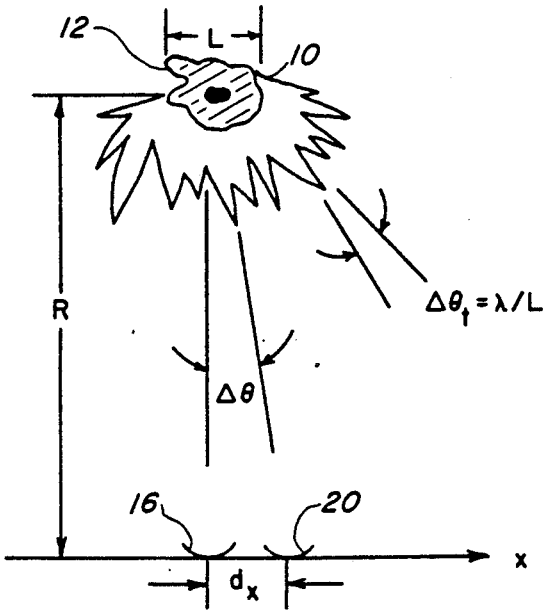
FIG. 2 is a projection of the effect of wavelength, range to the target, and effective width of the target in carrying out the invention according to FIG. 1.

This assumption is reasonable since the signals $S_M(t)$ and $S_A(t)$ fed to the correlator 26 arrive as a result of the illumination from the same target in a relationship which may be expressed as $$\Delta t = \Delta\theta/\Omega \quad (2)$$

where $\Omega$ is the angular yaw velocity substantially constant over $\Delta t$, and $\Delta t$ is the time it takes target 10 to rotate by the angle $\Delta\theta$ (FIG. 2).

From equation (1) and the definition of the cross correlation function $R_{MA}(\tau)$, (where the bar denotes time averaging), $$R_{MA}(\tau) = \overline{S_M(\tau) S_A(t+\tau)} = R_M(\tau - \Delta t) = \overline{S_M(t) S_M[(t+\tau-\Delta t]} \quad (3)$$

Under these assumptions, we may estimate $\Omega$, herein depicted as $\Omega$ by finding the value of $\tau$ which attains for $R_{MA}$ a maximum value, which value is called $\Delta t$.

It will be appreciated that it is unrealistic to assume that the illumination of the target is fixed relative to the target 10. A more practical assumption is that the illumination emanates from the antenna 16 in the form of the beam 14. As is well known in electromagnetic scattering theory, this has the effect of causing the scattering pattern of the target 10 to rotate at twice the speed. Thus, for such a case (2) may be rewritten as $\Delta t = \Delta\theta/2\Omega$. Since the function of the system embodying the invention is to arrive at a value for $\Omega$, it may be done by finding the value of $\tau$ which maximizes $R_{MA}(\tau)$, which we define as $\hat{\Delta t}$. Hence, letting $\Delta\theta = d_x/R$ and letting $\Omega$ be an estimate of $\hat{\Omega}$, it may be written $$\hat{\Omega} = d_x/2R\ \hat{\Delta t} \quad (4)$$

For the case only of rotation of the target 10 about the yaw axis, an image may be presented to the observer which is scaled correctly in cross-range. Specifically, echo components may be presented having doppler, $f_i$ at locations which are $u_i$ along the cross-range axis given by $$U_i = \lambda f_i / 2\hat{\Omega} \quad (5)$$

where the units of $u_i$ are the same as the units of the radar wavelength $\lambda$.

The above described derivation is based upon the two important conditions of (a) making the pulse rate fast enough to sample the signal (above the Nyquist rate) and (b) make $d_x$ large enough. Requirements to satisfy both conditions may be understood by reference to FIG. 2.

FIG. 2 shows the effects of $\lambda$, R and L, where L is the approximate dimension of the scattering pattern. As shown in FIG. 2, and assuming that $\lambda = 1/35$ feet and L equals 100 feet, we arrive at a value of $2.86 \times 10^{-4}$ radians (0.016 degrees). The signal fluctuation bandwidth will be about equal to the reciprocal of the time $T_c$, during which the scattering pattern rotates by the angle $\Delta\theta_t$.

If $\Omega = 0.1$ rad/sec, then $$T_c = (\Delta\theta_t)/\Omega = \lambda/(L\Omega) = 2.86 \text{ ms.} \quad (6)$$

Assuming now that condition (a) above is satisfied (Nyquist condition), we may exactly recover the signals $S_M(t)$ and $S_A(t)$ from the received echo pulses by interpolation in correlator 26. Having now preserved all available information, condition (b) as specified hereinabove is satisfied by making $d_x$ large enough to provide an accurate estimate of $\Delta t$.

If $d_x$ is greater than $R\lambda/L$ it is clear from Equation (3) that the delay, $\Delta t$, between $S_M(t)$ and $S_A(t)$ will be larger than the coherence time, which is well known for random variables, of the fluctuations. Stating in different terms, $\Delta t$ will be greater than the width of the correlation function, R ($\tau$). Note that $\Delta t > T_c$ if $$\Delta\theta = d_x/R > \lambda/L \quad (7)$$

From Equation (7) it is clear that if $$\Delta t = [d_x/(2R\Omega)] > R\lambda/(L\Omega) = T_c \quad (8)$$

then $\Delta t$ is greater than $T_c$ and reasonably accurate estimates of $\Omega$ will result. As one example of a representative group of parameters (if $\lambda = 1/35$ feet, R = 6,000 feet, and L = 100 feet, $d_x$ is greater than 1.7 feet; if R were to equal 4 nautical miles, and the other parameters R and L remain the same, $d_x$ is greater than 6.8 feet.

It will be appreciated that the aircraft attitude rate system of the present invention will enhance the ability of an ISAR radar to recognize the main features of an incoming airborne target. Particularly, it should be possible to discriminate between civil and military aircraft because of the sharp profile offered by the armament pods of the latter.

It will be understood that with the proper placement of another auxiliary antenna, attitude rate changes about the pitch axis may be measured as well by utilizing the features of the described embodiment. If the vertical component is estimated in the manner described hereinabove using a vertically rather than a horizontally separated auxiliary antenna, then the ISAR image can be correctly scaled when the rotation of the target is in a vertical plane. When the rotation is in neither plane, signals from the auxiliary antennas will be uncorrelated from the main antenna and estimates of attitude rates may be unavailable.

It will be understood that the invention is not limited to the embodiments described above, it being apparent to those skilled in the art that various changes and modifications may be made without departing from the spirit of the invention or the scope of the appended claims.

I claim:

1. A system for identifying an aircraft target by comprising:

a primary antenna for radiating a radar track along an axis z which is coincident with the track of an approaching aerial target;

an auxiliary antenna disposed on an axis x perpendicular to said z axis and spaced from the location of said primary antenna by a distance of $d_x$;

each of said primary and auxiliary antennas being positioned to produce respective signals $S_A$ and $S_M$ responsive to receipt of energy from said track reflected from said target, wherein:

$$S_A(t) = S_M(t - \Delta t)$$

and said $\Delta t$ is the time between receipt of said energy by said primary and auxiliary antennas;

and correlator means responsive to said signals $S_M$ and $S_A$ for estimating the rate of movement of said target about a predetermined axis.

2. A system according to claim 1, wherein said primary and auxiliary antennas are mounted in the same plane.

3. A system according to claim 1, wherein said signals $S_M(t)$ and $S_A(t)$ are recovered from received echo pulses along said track by interpolation in said correlator means.

* * * * *